(12) United States Patent
Hinderer et al.

(10) Patent No.: US 7,186,986 B2
(45) Date of Patent: Mar. 6, 2007

(54) RADIATION DETECTOR WITH CONVERTERS

(75) Inventors: Ralf Hinderer, Madison, WI (US); Harald Keller, Toronto (CA); Thomas R. Mackie, Madison, WI (US); Jeffrey Kapatoes, Madison, WI (US); David W. Pearson, Madison, WI (US); Paul J. Reckwerdt, Madison, WI (US); Richard C. Schmidt, Belleville, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/451,932

(22) PCT Filed: Jun. 17, 2002

(86) PCT No.: PCT/US02/19154

§ 371 (c)(1),
(2), (4) Date: Mar. 1, 2004

(87) PCT Pub. No.: WO02/103392

PCT Pub. Date: Dec. 27, 2002

(65) Prior Publication Data

US 2004/0183026 A1 Sep. 23, 2004

Related U.S. Application Data

(60) Provisional application No. 60/299,097, filed on Jun. 18, 2001.

(51) Int. Cl.
*G01T 1/185* (2006.01)
*H01J 47/04* (2006.01)

(52) U.S. Cl. .................. 250/375; 250/382; 250/389
(58) Field of Classification Search ................ 250/375, 250/382, 389, 393, 394, 371, 363.04, 363.03, 250/363.02, 370.11
See application file for complete search history.

(56) References Cited

U.S. PATENT DOCUMENTS

| | | | |
|---|---|---|---|
| 3,991,312 A * | 11/1976 | Whetten et al. ......... 250/385.1 |
| 4,055,767 A | 10/1977 | Allemand | |
| 4,476,390 A | 10/1984 | Hanawa | |
| 4,583,020 A * | 4/1986 | Cliquet et al. .......... 250/385.1 |
| 5,308,987 A * | 5/1994 | Wuest et al. ............. 250/374 |
| 5,604,783 A * | 2/1997 | Charpak ................ 250/385.1 |
| 6,043,495 A * | 3/2000 | Verger et al. .......... 250/370.01 |
| 6,333,506 B1 * | 12/2001 | Francke et al. ............. 250/389 |
| 6,731,065 B1 * | 5/2004 | Francke et al. ............. 313/532 |

OTHER PUBLICATIONS

H. Miyai, et al., Response of Silicon Detector for High Energy X-Ray Computed Tomography, Publication Date Oct. 30, 1993.
International Search Report for PCT/US/02/19154 filed Jun. 17, 2002.

* cited by examiner

*Primary Examiner*—David Porta
*Assistant Examiner*—Frederick F. Rosenberger
(74) *Attorney, Agent, or Firm*—Boyle Fredrickson Newholm Stein & Gratz S.C.

(57) ABSTRACT

A high efficiency radiation detector employs longitudinally extending converter elements receiving longitudinally propagating radiation to produce high-energetic electrons received by detector structures in interstitial spaces. The secondary electron generation in this architecture allows great freedom in selection of converter materials and thickness. A variety of detector mechanisms may be used including ionization-type detectors or scintillation-type detector.

4 Claims, 2 Drawing Sheets

RADIATION DETECTOR WITH CONVERTERS

CROSS REFERENCE TO RELATED APPLICATIONS

This application is based on provisional application 60/299,097 filed Jun. 18, 2001, and PCT application PTC/US/02/19154 filed Jun. 17, 2002 and entitled "Radiation Detector with Laterally Acting Converters" and claims the benefit thereof.

STATEMENT REGARDING FEDERALLY SPONSORED RESEARCH OR DEVELOPMENT

Not Applicable.

BACKGROUND OF THE INVENTION

Highly efficient photon detectors play a major role in countless applications in physics, nuclear engineering and medical physics. In nuclear engineering, radioactive waste can be characterized with photon detectors using nondestructive assay techniques (PNDA). In medical physics, photon detectors are extensively used for diagnostic x-ray and CT imaging, nuclear medicine, and quite recently, radiation therapy of cancer.

In radiation therapy of cancer, ever more accurate delivery techniques spur the need for efficient detectors for million electron volt (MeV) photons in order to allow the imaging of the patient during radiation delivery. In particular, in Tomotherapy, a detector for MeV photons can be used for both the CT imaging and for verifying the dose received by the patients.

Referring now to FIG. 1, an ionization detector 10 may be used for the detection of radiation in the thousand electron-volt (KeV) range such as is used in conventional diagnostic x-ray and CT. The ionization detector 10 employs a set of conductive laminae 12 oriented generally along an axis 14 of the propagating radiation. The lamina 12 may be spaced apart along a transverse axis generally parallel to the radiation axis 14 in parallel configuration defining between them detector volumes 16. The detector volumes 16 may be filled with a gas having a high atomic number, such as xenon, which may be further pressurized to increase the density of xenon atoms within the detector volume 16.

An incident KeV x-ray 18 entering the detector volume 16 will have a high probability of colliding with a xenon atom (not shown) to create one or more secondary electrons 20 within the detector volume 16. These electrons 20 produce negatively and positively charged ions within the detector volume 16. The height of the detector volume 16 along the radiation axis 14 may be adjusted so that substantially all KeV x-rays 18 entering the detector volume 16 will experience one such collision.

Opposite laminae 12 surrounding the given detector volume 16 are biased with a voltage source 21 causing the migration of the ionization charge to the oriented lamina 12. The current generated by such electron flow is measured by a sensitive ammeter circuit 22, providing an indirect measure of the amount of incident KeV radiation 18.

The laminae 12 thus first serve as collector plates for the ionization detector 10. They also serve to block oblique KeV radiation 18' scattered by the intervening patient from being imaged thus improving the sharpness and clarity of the image. The laminae 12 further serve to prevent migration of the electrons 20 between detector volumes 16 such as would produce cross talk further blurring the image. The laminae 12 are optimized in thickness in the transverse direction consistent with these roles.

The ionization detector 10 of FIG. 1 would not be expected to be efficient for MeV x-rays which would be expected to pass fully through any practical thickness of xenon, generating relatively few electrons.

Referring now to FIGS. 2a and 2b, more efficient detection of MeV x-rays 24 may be accomplished by the use of a converter plate 26 which converts the MeV x-rays into high-energetic charged particles which are subsequently recorded electronically or photonically. In a first embodiment of FIG. 2a, a detector 25 uses a converter plate 26 that is an opaque, high density, high atomic number material, such as lead, placed above detector media 28 to convert each photon of MeV x-rays 24 into multiple electrons 20. The detector media 28 may be film, an ionization-type detector 10, a scintillation detector or other well-known detector types.

A high atomic number and/or high-density material is preferred for the converter plate 26 because it has a high cross-section for the interaction of high-energy photons. Generally, however, the height 30 of the converter plate 26 is limited to less than that required to filly absorb the MeV x-rays 24 correspondingly limiting the conversion efficiency of the detector 25. The reason for this is that increasing the height 30 to provide for more absorption of MeV x-rays becomes fruitless as additional ejected electrons are balanced by increased absorption of electrons within the converter plate 26 itself.

Referring to FIG. 2b, the limitation imposed by the converter plate 26 of detector 25 of FIG. 2a, may be overcome by using a transparent scintillating converter plate 26' as shown in FIG. 2b. Here the MeV x-rays 24 striking the scintillating converter plate 26' produce photons 34 which pass through the transparent scintillating converter plate 26' to be received by light detector 36. The transparent scintillating converter plate 26' may be made thick enough to block a greater proportion of the MeV x-rays 24 because the mobility of photons within the transparent scintillating converter plate 26' is proportionally much greater than the mobility of electrons within the solid converter plate 26. Transverse movement of the photons within the transparent scintillating converter plate 26' may be blocked by opaque elements 38 which may, for example, be slices cut into the material of transparent scintillating converter plate 26' and filled with a light and x-ray blocking material so as to define regular detection areas.

Ideally the scintillating material will have a relatively high atomic number and great transparency. Unfortunately, the manufacture of transparent scintillating converter plate 26' using such high quality scintillators is significantly more expensive than the manufacture of conventional converter plate 26 shown in FIG. 2a and the efficiencies of such radiation detectors remain modest.

What is needed is a relatively simple, inexpensive, and high efficiency radiation detector suitable for high-energy radiation.

BRIEF SUMMARY OF THE INVENTION

The present inventors have recognized that the height limitation of the converter plate, such that avoids reabsorption of electrons, may be overcome by breaking the converter plate into a plurality of axially extending converter elements. High-energetic electrons and, depending on the energy of the incident radiation, other positive and negative charge carriers, exit the converter material into the detector volumes placed between the converter elements. Converter elements may now be of arbitrary height in the longitudinal direction with electrons generated both at the top of the converter and the bottom of converter likewise liberated only a short distance, through the converter element into the detector. In this way, the problem of electrons being retained by the converter as it increases in height is substantially eliminated and converter height sufficient to convert substantially all MeV x-rays can be contemplated.

Specifically then, the present invention provides a radiation detector providing a plurality of converter laminae oriented to extend substantially longitudinally along the propagation axis of the radiation and spaced transversely across the axis to define a plurality of axially extending detector volumes. Laminae receive radiation longitudinally and liberate electrons into the detector volumes. Detector structure for detecting electrons liberated into the detector volumes provides substantially independent signals.

Thus it is one object to provide a new detector geometry that uses relatively inexpensive converter materials to provide extremely high converter efficiencies. The longitudinal thickness of the converter material is no longer limited and may be adjusted to provide for absorption of a substantially greater proportion of the radiation.

The detection structure may be a scintillator within the detector volume optically coupled to a photodetector or may be an ionizing gas or other material coupled to a collecting electrode assembly, the latter of which may, in part, be the laminae.

Thus it is another object of the invention to provide a new detector geometry suitable for use with a number of detecting mechanisms.

The laminae may be substantially parallel plates or may be tubes with coaxial wires where the detector volumes are the spaces between the tubes and the wires.

Thus it is another object of the invention to provide for the improved detector structure offering one-dimensional, two dimensional/areal or even fully general three-dimensional detector versions.

The tubes may contain a coaxial wire and the detector volume may be the space between the tube and wire, which are used as part of an ionization chamber. Or the tube may be filled with a scintillating material.

Thus it is another object of the invention to provide for either an areal scintillation or areal ionization-type detector. It another object of the invention to allow the use of relatively low quality scintillation materials, for example, those having low atomic number to produce a high efficiency detection device.

The longitudinal length of the laminae may be sized to substantially block the radiation and the transverse width of the laminae may be less than the average propagation distance of an electron in the material of the laminae.

Thus it is another object of the invention to provide for a detector assembly suitable for use with a wide range of radiation energies and converter materials.

The laminae may be tipped with respect to the radiation axis so as to increase the area of the detector over which radiation is intercepted by a lamina Thus it is another object of the invention to provide the benefits described above while increasing the efficiency of the detector by improving the capture of radiation by laminae.

The laminae may be aligned with lines of radius extending from a detector focal point and the radiation source may be positioned so that the radiation emanates from a point displaced from the focal point. This displacement would allow to easily place the detector into the radiation beam without causing the detector signals to be highly sensitive to the exact position of the detector with respect to the radiation source.

It is yet another object of the invention to allow for the use of off-the-shelf KeV x-ray detectors for MeV detection. Defocusing the detector increases the interception of radiation by a lamina changing the mechanism of the detector from a standard ionization detector to a converter/ionization detector of the present invention.

The foregoing objects and advantages may not apply to all embodiments of the inventions and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE PREFERRED EMBODIMENT

Figure 3:
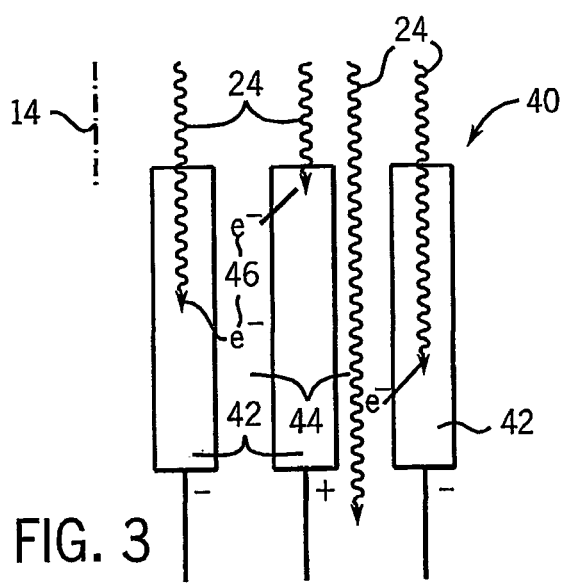
FIG. 3 is a cross-sectional view of a detector of the present invention having multiple longitudinal converter elements generating high-energetic electrons exiting the converter media producing ionization charges that may be collected in an ionization-type detector.

Referring now to FIG. 3, a detector 40 of the present invention provides for a series of longitudinally extending converter elements 42 aligned generally with the local radiation axis 14 of radiation propagation. The converter elements 42 may be, for example, planar vanes or may be rods or other shapes.

Converter elements 42 are separated from each other in a direction transverse to the radiation axis 14 to create interconverter volumes 44 such as may be filled with an ionizing medium such as a gas including, for example, xenon. The gas may be compressed in a housing (not shown) so as to increase the odds of electron-gas interaction in the interconverter volumes 44.

MeV x-rays 24 received by the detector 40 strike the converter elements 42 to produce high-energetic electrons 46 which proceed into the interconverter volumes 44. The electrons ionize the gas in the interconverter volumes 44. Some MeV x-rays 24' will pass completely through interconverter volumes 44 without contacting the converter elements 42 and may produce some ionization. However, in the invention, this ionization will be less than the ionization caused by high-energetic electrons 46 exiting the converter.

Adjacent converter elements 42 may be given voltages of opposite polarity so as to provide a biasing field collecting the ionization charges whose flow may be measured using current detector circuitry well known in the art ionization detectors.

Figure 1:
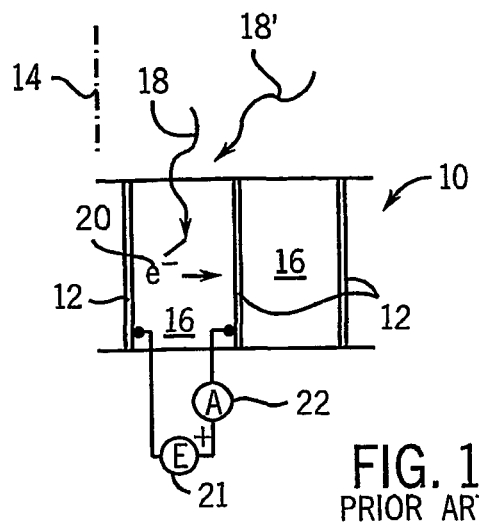
FIG. 1 is a cross-sectional view of a prior art ionization detector for KeV x-rays taken along a plane of radiation propagation, as has been described above in the background of the invention.
Figures 2A, 2B:
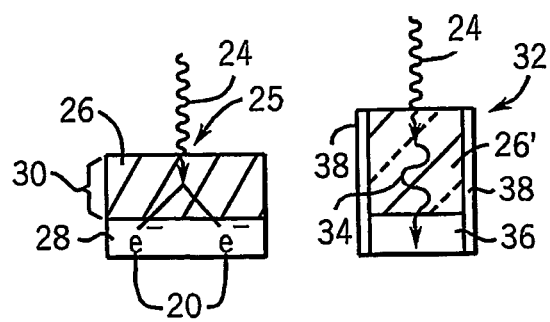
FIGS. 2a and 2b are cross-sectional views similar to that of FIG. 1 but of prior art ionization detectors for MeV x-rays having single transverse converter elements as have also been described above in the background of the invention.

In this embodiment, the material of the converter element 42 is preferably a conductive metal so as to support the current flows of the ionization, however, the function of collecting charge may be separated from the function of converting x-rays to electrons and non-metallic converter elements having a conductive coating are also possible. Similarly, in this embodiment, the converter elements 42 are preferably composed of a high atomic number and/or high-density material so as to reduce their height and so as to provide efficient reduction of scattered x-rays like the laminae 12 described with respect to FIG. 1. Nevertheless, it will be recognized that a variety of different materials may be used depending on manufacturing convenience, the energy of the radiation, and the desire for compactness.

Figure 4:
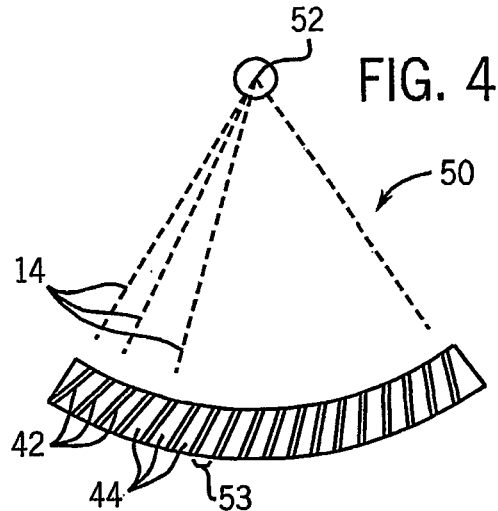
FIG. 4 is a cross-sectional view of one embodiment of the detector assembly of FIG. 3 positioned with respect to a radiation source and presenting longitudinal but tipped converter elements so as to increase the area of the radiation beam intercepted by the converter elements.
Figure 5:
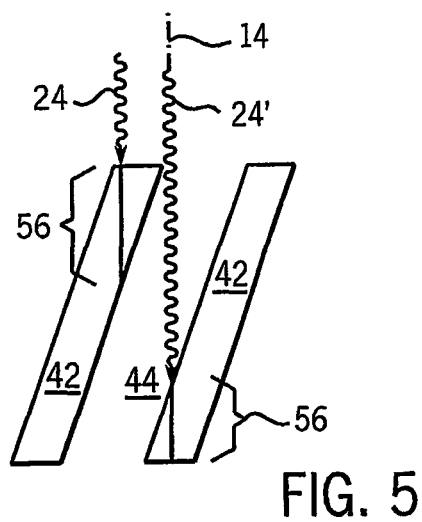
FIG. 5 is a detailed view of FIG. 4 showing the path of adjacent x-rays, both of which are intercepted by tipped converter elements.

Referring now to FIG. 4, a detector array 50 may be created by arranging a number of converter elements 42 along an arc of constant radius about a focal spot 52. A radiation source is placed at the focal spot 52 to as to create a fan beam of radiation whose local radiation axes 14 are lines of radius from the focal spot 52 to the detector array 50. The converter elements 42 extending generally longitudinally with respect to the local radiation axis 14 but are also slightly tipped with respect to the local radiation axis 14. Referring also to FIG. 5, this tipping of the converter elements 42 increases the area over which the radiation beam, for example, MeV x-rays 24' will strike a converter element 42 and not pass unintercepted through an interconverter volume 44. Preferably, the tipping will be equal to the width of the converter element 42 in the transverse direction over the height of the converter element in the longitudinal direction. However, more or less tipping may also be used, including none as will be described below. When the converter elements 42 are tipped, the height and width of the converter elements 42 may be adjusted to ensure that a path length 56 of MeV x-rays 24' through the converter element 42 is sufficient to ensure probable absorption of the MeV x-rays 24'.

The slopped sides of the converter elements 42 such as produced by the tipping as shown in FIG. 4 need not be monotonic but adjacent converter elements 42 may alternatively have, for example, interdigitating projections so as to preserve an interconverter volume 44 but to expose no direct through path between converter elements 42.

Figure 6:
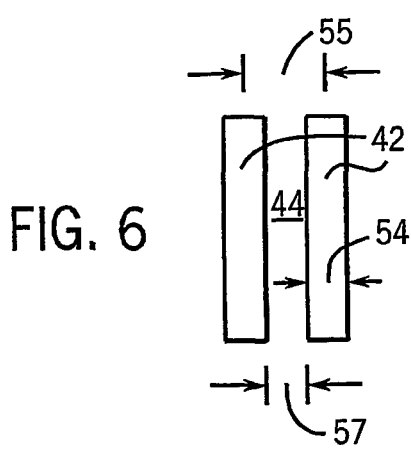
FIG. 6 is a simplified schematic view of two converter elements showing important dimensions for the converter elements such as depend on the material of the converter elements and their application.

Referring to FIG. 6, the preferred dimensions of the converter elements 42 will depend on the radiation energy, the material of the converter elements 42 and the desired resolution of the detector. Generally the centerline spacing 55 of the converter elements 42 will be determined by the spatial resolution desired in the resultant detector. The width 54 of the converter elements 42 will depend on their material and a tradeoff between the spacing 55 between converter elements 42 which determines the width 57 of detector material and the width 54 of the converter elements 42 which determine the amount of conversion, both which relate to conversion efficiency. Potentially the thickness of the converter element 42 may be quite small making use of breakthroughs in the production of so-called nano-wires of extremely small diameter.

Figure 7:
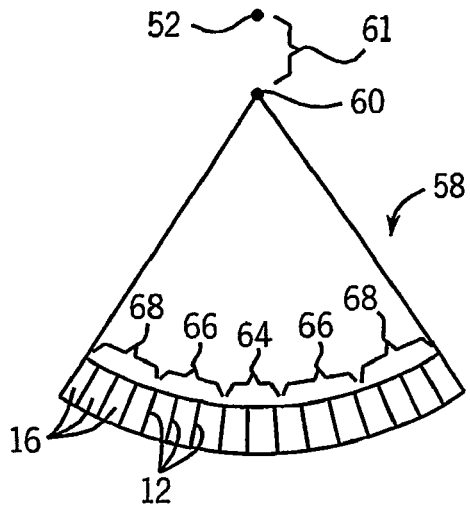
FIG. 7 is a figure similar to that of FIG. 4 showing a conventional CT-type KeV ionization detector modified for use with MeV x-rays by movement of the focal point of radiation such as causes ionization by high-energetic electrons exiting the converter in preference to the intended ionization by direct radiation.

Referring now to FIG. 7, a conventional CT ionization-type KeV detector 58 such as one manufactured by the General Electric Company for its KeV CT machines may be applied for use with MeV x-rays using the present invention's mechanism of generating electrons using the laminae of the detector as converter elements 42. Absent recognition of the conversion properties of the laminae, use of such a detector for MeV radiation would be counter intuitive because of the expected low interaction of MeV radiation with the inter-laminae gas. This particular detector 58 provides in effect an array of 50, 738 converter elements 42 formed from the tungsten laminae. Up to 500-volt potential may be applied across adjacent converter elements 42 in an alternating configuration. For a fan beam detector, the height of the detector may be 3.56 cm and the detector may be 44 cm long to measure a six MeV beam.

Improved sensitivity may be provided by defocusing the detector 58. As shown in FIG. 7, an actual focal point 60 is defined by the orientation of the laminae 12 such as divided the ionization chamber into detector volumes 16. Focal point 60 maybe displaced typically inward by a predetermined amount 61 from the focal spot 52 of the MeV x-rays thus causing the x-rays from focal spot 52 to strike the laminae 12 at an angle increasing the absorption of radiation and their liberation of electrons. For example, the detector 58 may have a focal point of 103.6 cm and be placed 141 cm away from focal spot 52.

Figure 8:
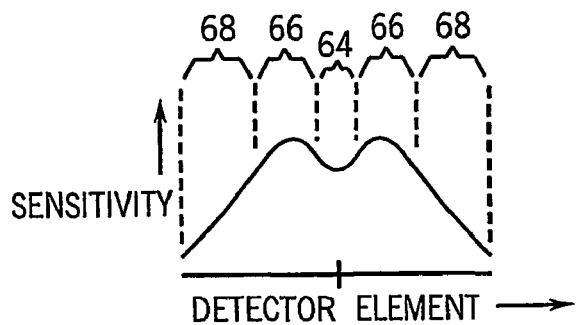
FIG. 8 is a plot of detector efficiency as a function of angle along the detector of FIG. 7 showing a drop off of efficiency toward the center of the detector in which the detector veins are tipped less with respect to the incident radiation.

Referring to FIG. 8, the centermost lamina 12 in region 64, which despite this displacement are essentially aligned with radiation from the focal spot 52, exhibit a decreased sensitivity in comparison with those off center lamina in regions 66 which are receiving radiation directed against their sides as well as their ends. Edge most laminae 12 in regions 68 exhibit decreased sensitivity because of shadowing caused by adjacent laminae 12.

Figure 9:
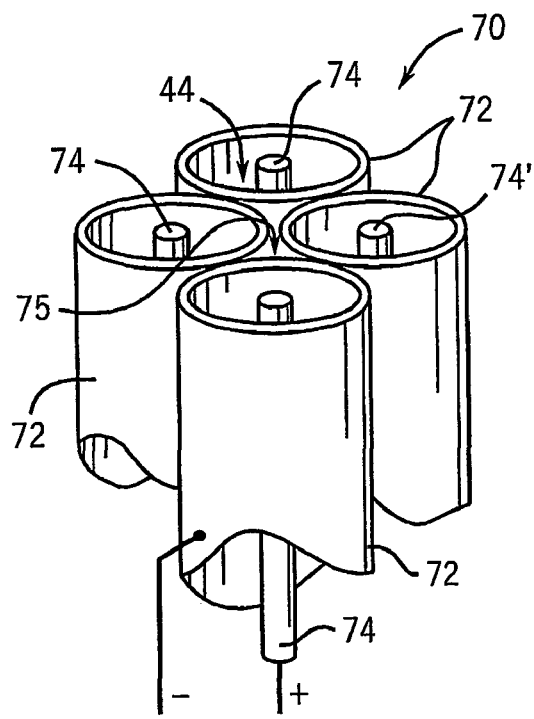
FIG. 9 is fragmentary perspective view of an embodiment of the present invention for providing an area detector composed of tubes with concentric wire conductors as the converter elements.

Referring now to FIG. 9, an areal detector 70 may be constructed along the principals described above, by using a set of longitudinally aligned tubes 72 having coaxial wires 74. Here the interconverter volumes 44 are those spaces between the walls of the tubes 72 and the wires 74. Intertube regions 75 do not serve for detection in this embodiment but are relatively minor in area.

In this embodiment, the coaxial wires 74 may be given a positive charge to collect negative charge carriers formed by ionization of gas held in the interconverter volumes 44 between the wires 74 and the walls of the tubes 72 or vice versa. Here both tubes 72 and wires 74 provide for conversion properties projecting liberated electrons for detection. It will be understood that the tubes 72 may be packed to define an arbitrary area and that each tube 72 and coaxial wire 74 defines a detector element.

Figure 10:
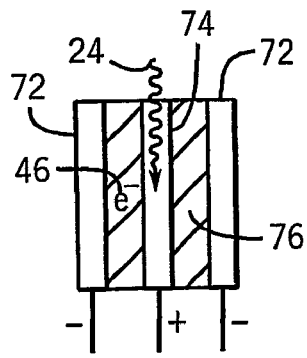
FIG. 10 is a cross-sectional view through the tube and wire construction of FIG. 9 showing a further embodiment where the gaseous ionization medium is replaced with a solid state semiconductor material.

Referring to FIG. 10, in an alternative embodiment, the space between the wire 74 and tube 72 (converter materials) may be filled with a semi-conductor material such as amorphous selenium 76 (detector material) so as to produce hole-electron pairs which may be collected by the electrodes formed by the wire 74 and tube 72.

Figure 11:
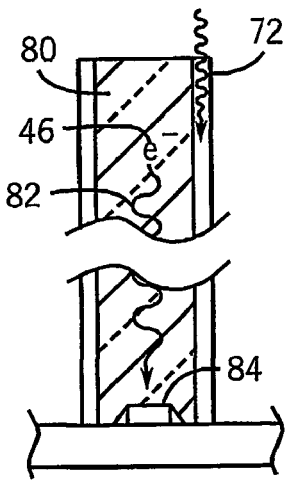
FIG. 11 is a figure similar to that of FIG. 10 showing a further embodiment where the center wire conductor of the tube is replaced with a scintillating material to transmit light to a photo-detecting device.

Referring now to FIG. 11, in yet a further embodiment, the wire 74 may be dispensed with and the tube 72 filled with a scintillator material 80 receiving the liberated electrons 46 and emitting a photon 82 for detection by a solid-state photo detector 84. The use of the structure of tubes 72 limits the necessity that the scintillator material 80 have significant conversion properties (of converting radiation to photons) or be highly transparent (as its height may be limited by proper choice of the converter materials of the tube 72). This allows lower cost scintillating material to be used. It will be understood from the above description, that the above described invention employing a generating and liberating electron mechanism may be used for KeV or lower energy radiation including visible light. Generally, the dimensions of the detector structures are fully scalable with the energy of the incident radiation. Higher energy of the incident radiation translates to larger detector structures (converter material and detection material), and lower energy of the incident radiation translates to smaller detector structures. As used herein, converter materials are the materials that covert radiation photons to electrons and detector materials are materials that are used in the detection of the electrons (e.g. ionizable gasses or semiconductors). The lower limit of scalability is only determined by atomic dimensions. Thus, the converter material can be of a nanometer scale (nanostructure), e.g., having dimensions (for example the width of the converter elements) less than 100 nanometers.

The longitudinal converter mechanism also has potential application in the field of radiation sensitive films where converter structures, possibly in the form of freely dispersed filaments or aligned filament structures using electrostatic techniques and the like, may be embedded in the emulsion of the film itself with liberated electrons interacting with the silver compounds of the emulsion to produce a higher sensitivity in the film than that which would normally be provided by the film alone.

It is specifically intended that the present invention not be limited to the embodiments and illustrations contained herein, but that modified forms of those embodiments including portions of the embodiments and combinations of elements of different embodiments also be included as come within the scope of the following claims. For example, the use of semiconductor detectors or scintillation detectors could be used with the embodiment of FIG. 4.

We claim:

1. A megavoltage radiation detection system comprising:
   a radiation source directing megavoltage radiation along a propagation axis;
   a detector positioned to receive the radiation along the propagation axis, the detector including a plurality of substantially identical converter elements spaced transversely across the detector to define a plurality of detector volumes between opposed walls of the converter elements, wherein the opposed walls of the converter elements are angled with respect to the axis of propagation to increase the area over which radiation is intercepted by the converter elements, the converter elements receiving radiation and generating high-energetic electrons exiting the converter elements into the detector volumes;
   a voltage source biasing opposed converter elements; and
   a circuit providing a measure of current flowing between opposed converter elements to collect and detect charged high-energetic particles emitted into the detector volumes by the converter elements when the radiation interacts with the converter elements to provide for substantially independent signals,
   wherein the opposed walls are tipped according to lines of radius extending from a detector focal point and wherein the radiation source is positioned so that the megavoltage radiation emanates from a point displaced from the focal point, whereby the area of the detector in which radiation is intercepted by opposed walls is increased.

2. The megavoltage radiation detection system of claim 1 wherein the opposed walls are angled at a substantially constant amount relative to a local axis of propagation for a system having detector focal distance offset from a point at the radiation source from which radiation emanates.

3. A method of detecting radiation comprising:
   (a) providing a plurality of converter elements spaced transversely across a detector to define a plurality of detector volumes, the converter elements receiving radiation and generating positively and negatively charged particles exiting the converter elements into the detector volumes;
   (b) angling the walls of the converter elements with respect to the axis of radiation propagation to increase the area of the detector over which radiation is intercepted by the converter elements;
   (c) applying a voltage across adjacent opposed converter elements and measuring a current flowing between the opposed converter elements to detect a series of substantially independent signals related to different opposed converter elements; and,
   (d) generating an image from the substantially independent signals;
   wherein the converter elements are matched to the radiation, in size, composition, and arrangement and wherein the converter elements are tipped according to lines of radius extending from a detector focal point and including the step of positioning a radiation source so that the radiation emanates from a point displaced from the focal point whereby the area of the detector in which radiation is intercepted by the converter elements is increased.

4. The method of claim 3 wherein the walls of the converter elements are aligned with lines of radius extending from a detector focal point and wherein a radiation source is positioned so that the radiation emanates from a point displaced from the focal point.

* * * * *

UNITED STATES PATENT AND TRADEMARK OFFICE
CERTIFICATE OF CORRECTION

PATENT NO. : 7,186,986 B2 Page 1 of 1
APPLICATION NO. : 10/451932
DATED : March 6, 2007
INVENTOR(S) : Hinderer et al.

It is certified that error appears in the above-identified patent and that said Letters Patent is hereby corrected as shown below:

Col. 1, line 16  Replace "Not Applicable" with --This invention was made with United States government support awarded by the following agency: DOE  DE-FG07-00ID13918. The United States government has certain rights in this invention.--

Signed and Sealed this

Seventeenth Day of November, 2009

David J. Kappos
*Director of the United States Patent and Trademark Office*